(12) United States Patent
Li et al.

(10) Patent No.: US 10,178,228 B2
(45) Date of Patent: Jan. 8, 2019

(54) METHOD AND APPARATUS FOR CLASSIFYING TELEPHONE DIALING TEST AUDIO BASED ON ARTIFICIAL INTELLIGENCE

(71) Applicant: BAIDU ONLINE NETWORK TECHNOLOGY (BEIJING) CO., LTD., Beijing (CN)

(72) Inventors: Chao Li, Beijing (CN); Xiangang Li, Beijing (CN); Jue Sun, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/789,974

(22) Filed: Oct. 21, 2017

(65) Prior Publication Data
US 2018/0115641 A1    Apr. 26, 2018

(30) Foreign Application Priority Data
Oct. 21, 2016  (CN) .......................... 2016 1 0921879

(51) Int. Cl.
*H04M 1/24* (2006.01)
*H04M 3/08* (2006.01)
(Continued)

(52) U.S. Cl.
CPC ...... *H04M 3/42059* (2013.01); *G06N 3/0445* (2013.01); *G06N 3/08* (2013.01); *H04M 3/26* (2013.01); *G06N 3/0454* (2013.01); *G10L 25/30* (2013.01); *G10L 25/51* (2013.01); *G10L 25/78* (2013.01)

(58) Field of Classification Search
CPC ... H04L 2209/56; H04L 63/08; H04L 3/0876; H04M 3/42059; H04M 3/436; H04M 3/54; H04M 2203/6027; H04M 2203/6045; H04M 2203/2066; H04M 3/382; H04M 3/42042; H04W 12/06; G06F 2221/0102; G06F 2221/2117; G06F 21/42; G06F 21/23; G06F 21/44; G06F 2221/2123;
(Continued)

(56) References Cited

U.S. PATENT DOCUMENTS

| 7,974,395 B2 * | 7/2011 | Abramson ............ H04M 3/436 379/114.14 |
| 9,762,728 B1 * | 9/2017 | Cox ...................... H04M 3/382 |

(Continued)

*Primary Examiner* — Binh Kien Tieu
(74) *Attorney, Agent, or Firm* — Lathrop Gage LLP (57) ABSTRACT

A method and an apparatus for classifying a telephone dialing test audio based on AI is provided. Data of a telephone dialing test audio is acquired first, then the data of the telephone dialing test audio is processed via a preset classifier so as to obtain similarities among the data of the telephone dialing test audio and telephone types in the preset classifier, in which the preset classifier is a deep-learning model determined by historical data of telephone dialing test audios and their corresponding telephone types; finally, the telephone type corresponding to the telephone dialing test audio is determined according to the similarities. With the method and apparatus, the telephone dialing test audio is classified via machine learning to determine whether a user is a normal user, thus human costs is saved and an efficiency of dialing test is increased.

18 Claims, 2 Drawing Sheets

(51) Int. Cl.
*H04M 3/22* (2006.01)
*H04M 3/42* (2006.01)
*G06N 3/04* (2006.01)
*G06N 3/08* (2006.01)
*H04M 3/26* (2006.01)
*G10L 25/30* (2013.01)
*G10L 25/51* (2013.01)
*G10L 25/78* (2013.01)

(58) Field of Classification Search
CPC .... G06Q 20/42; G06Q 30/04; G06Q 30/0601; G06Q 40/025
USPC ......... 379/93.02, 93.03, 93.04, 93.14, 93.18, 379/114.14, 100.03, 100.05, 100.06, 379/100.12, 102.02, 142.01, 142.04, 379/142.06, 142.1, 142.17, 182, 183, 188, 379/189, 207.04, 207.11, 207.13, 207.15, 379/210.02, 210.03, 212.01
See application file for complete search history.

(56) References Cited

U.S. PATENT DOCUMENTS

| | | | |
|---|---|---|---|
| 2002/0095295 A1* | 7/2002 | Cohen | H04M 3/493 704/275 |
| 2006/0149558 A1* | 7/2006 | Kahn | G10L 15/063 704/278 |
| 2007/0036314 A1* | 2/2007 | Kloberdans | H04L 63/14 379/189 |

* cited by examiner

METHOD AND APPARATUS FOR CLASSIFYING TELEPHONE DIALING TEST AUDIO BASED ON ARTIFICIAL INTELLIGENCE

CROSS-REFERENCE TO RELATED APPLICATION

This application is based on and claims a priority to Chinese Patent Application Serial No. 201610921879.2, filed on Oct. 21, 2016, the entire content of which is incorporated herein by reference.

FIELD

The present disclosure relates to the field of audio technology, and more particularly, to a method and an apparatus for classifying a telephone dialing test audio based on Artificial Intelligence.

BACKGROUND

Artificial Intelligence (AI for short) is a new technical science of researching and developing theories, methods, techniques and application systems for simulating, extending and expanding human intelligence. Artificial Intelligence is a branch of computer science, which attempts to understand the essence of intelligence and to produce an intelligent robot capable of acting as a human. The researches in this field include robots, speech recognition, image recognition, natural language processing and expert systems, etc.

With the development of computer technology and popularization of the Internet, shopping online is expanded faster and faster. A user can buy almost everything at home. While commercial fraud based on the Internet appears therewith, for example, a lot of users attempt to obtain extra benefit from on-line shopping platforms by means such as false telephone number, such that benefit of the seller may be harmed.

SUMMARY

Embodiments of the present disclosure provide a method for classifying a telephone dialing test audio based on AI, including: acquiring data of a telephone dialing test audio; processing the data of the telephone dialing test audio via a preset classifier, and acquiring similarities among the data of the telephone dialing test audio and telephone types in the preset classifier, in which, the preset classifier is a deep-learning model determined by historical data of telephone dialing test audios and telephone types corresponding to the historical data of the telephone dialing test audios; determining a telephone type corresponding to the telephone dialing test audio according to the similarities.

Embodiments of the present disclosure provide an apparatus for classifying a telephone dialing test audio based on artificial intelligence, including: a processor; a memory for storing instructions executable by the processor; in which, the processor is configured to: acquire data of a telephone dialing test audio; processing the data of the telephone dialing test audio via a preset classifier, and acquire similarities among the data of the telephone dialing test audio and telephone types in the preset classifier, in which, the preset classifier is a deep-learning model determined by historical data of telephone dialing test audios and telephone types corresponding to the historical data of the telephone dialing test audios; determine a telephone type corresponding to the telephone dialing test audio according to the similarities.

Embodiments of the present disclosure provide a non-transitory computer readable storage medium. When instructions stored in the storage medium is executed by a processor of a mobile terminal, the mobile terminal is caused to perform a method for classifying a telephone dialing test audio based on AI, in which the method includes:
acquiring data of a telephone dialing test audio; processing the data of the telephone dialing test audio via a preset classifier, and acquiring similarities among the data of the telephone dialing test audio and telephone types in the preset classifier, in which, the preset classifier is a deep-learning model determined by historical data of telephone dialing test audios and telephone types corresponding to the historical data of the telephone dialing test audios; determining a telephone type corresponding to the telephone dialing test audio according to the similarities.

Embodiments of the present disclosure provide a computer program product. When instructions stored in the computer program product is executed by a processor, a method for classifying a telephone dialing test audio based on AI is performed, in which the method includes: acquiring data of a telephone dialing test audio; processing the data of the telephone dialing test audio via a preset classifier, and acquiring similarities among the data of the telephone dialing test audio and telephone types in the preset classifier, in which, the preset classifier is a deep-learning model determined by historical data of telephone dialing test audios and telephone types corresponding to the historical data of the telephone dialing test audios; determining a telephone type corresponding to the telephone dialing test audio according to the similarities.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The method and apparatus for classifying a telephone dialing test audio based on AI according to embodiments of the present disclosure will be described with reference to drawings as follows.

Figure 1:
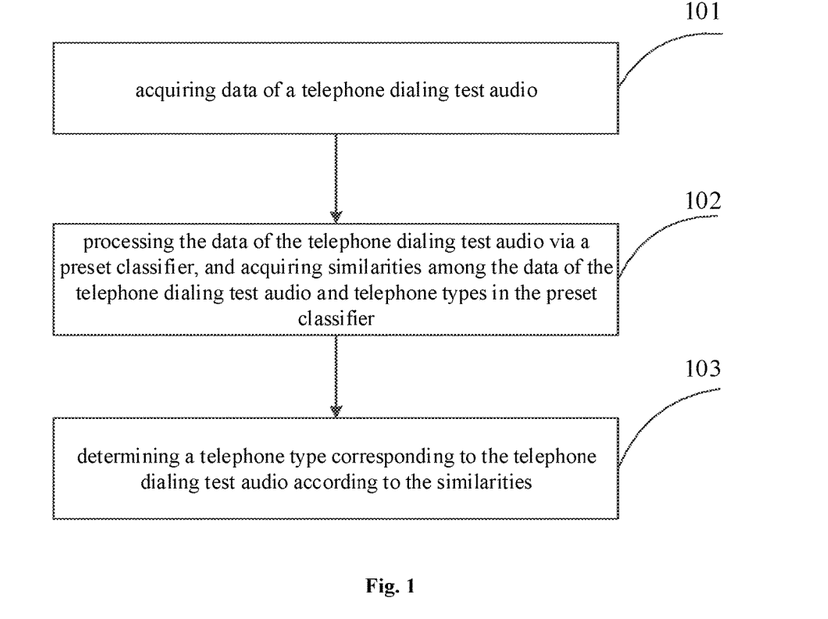
FIG. 1 is a flow chart illustrating a method for classifying a telephone dialing test audio based on AI according to an embodiment of the present disclosure.

FIG. 1 is a flow chart illustrating a method for classifying a telephone dialing test audio based on AI according to an embodiment of the present disclosure.

As illustrated in FIG. 1, the method for classifying a telephone dialing test audio based on AI includes following actions.

In block 101, data of a telephone dialing test audio is acquired.

In detail, an execution subject of the method for classifying a telephone dialing test audio based on AI provided in embodiments of the present disclosure is an apparatus for classifying a telephone dialing test audio based on AI according to embodiments of the present disclosure. The apparatus may be provided in all kinds of applications so as to realize determination and classification of the user.

It should be noticed that, when applications such as Baidu takeaway and Baidu Nuomi are used in a terminal, a terminal number, such as a mobile phone number or a fixed-line telephone number is required in advance. Therefore, when the apparatus for classifying a telephone dialing test audio based on AI tends to determine authenticity of the user, the terminal number of the user is dialed, and then it is determined whether the user is the normal user according to a feedback audio (i.e. the telephone dialing test audio).

Here, the data of the telephone dialing test audio refers to data of a feedback audio in response to dialing performed by the apparatus for classifying a telephone dialing test audio to the user's telephone. For example, the data of the feedback audio may be such as an audio read as "dudu . . . ", or "the number you dialed is busy now, please redial later", etc.

In practice, to avoid a long period of time during dialing test, which may disturb the user or may be disliked by the user, a certain length of the telephone dialing test audio is preset for acquiring the data of the telephone dialing test audio.

In block 102, the data of the telephone dialing test audio is processed via a preset classifier so as to acquire similarities among the data of the telephone dialing test audio and telephone types in the preset classifier.

In detail, the preset classifier is a deep-learning model determined by historical data of telephone dialing test audios and their corresponding telephone types.

In block 103, a telephone type corresponding to the telephone dialing test audio is determined according to the similarities.

In detail, the historical data of the telephone dialing test audios and their corresponding telephone types, refer to data of the telephone dialing test audios and their corresponding telephone types these have already be verified manually. For example, when the telephone dialing test audio is an audio reading as "dudu . . . " or a coloring ring back tone, the corresponding user is the normal user; when the telephone dialing test audio is an audio reading as "the number you dialed does not exist" or "the number you dialed is invalid", the corresponding user is a cheating user; when the telephone dialing test audio is an audio reading as "the number you dialed is busy now, please redial later" or "the number you dialed is power-off", the corresponding user is a pending user.

The deep-learning model may be a deep neural network (DNN), a convolutional neural network (CNN), a recurrent neural network (RNN), or a long short-term memory network with recurrent projection layer (LSTMP), etc., which is not limited here.

In practice, first, the preset classifier is acquired via training the deep-learning model via the historical data of the telephone dialing test audios and their corresponding telephone types, then the acquired data of the telephone dialing test audio is classified using the preset classifier to determine the telephone type corresponding to the acquired telephone dialing test audio. Detail methods for training the model are already developed in the related art, and thus will not be elaborated here.

It should be understood that, since the recognition and processing of the telephone dialing test audio are based on acoustic characteristics of the telephone dialing test audio, in the present disclosure, before processing the data of the telephone dialing test audio via the preset classifier, the method may also include extracting effective acoustic characteristics from the data of the telephone dialing test audio according to preset rules.

Figure 2:
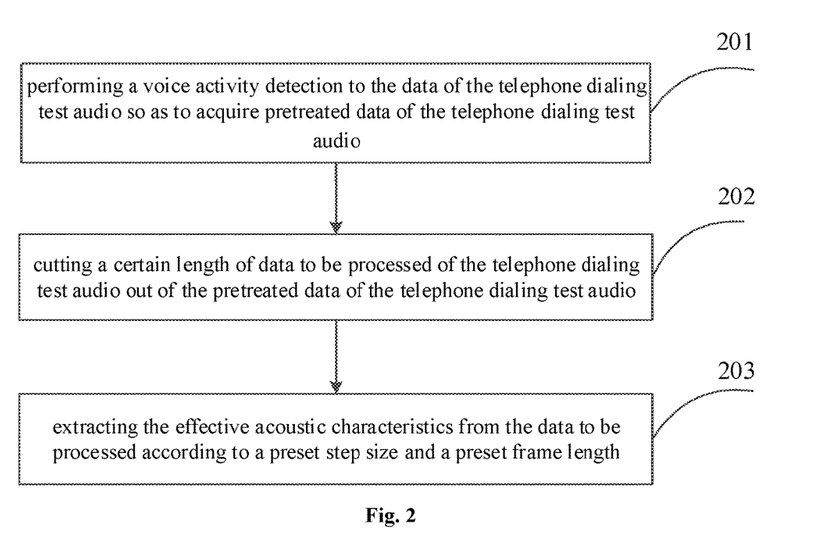
FIG. 2 is a flow chart illustrating a method for classifying a telephone dialing test audio based on AI according to another embodiment of the present disclosure.

In detail, as illustrated in FIG. 2, the above process may include following actions.

In block 201, a voice activity detection (VAD) is performed to the data of the telephone dialing test audio so as to acquire pretreated data of the telephone dialing test audio.

VAD is a kind of technique used in speech processing to determine whether there is a speech signal.

It should be understood that not all the feedback telephone dialing test audios are valid. For example, before a call is put through, there may be a period of mute time, if this part of the audio is considered as the data of the telephone dialing test audio, training result of the deep-learning model or classification result of the data of the telephone dialing test audio may be influenced.

In embodiments of the present disclosure, the data may be sampled in a preset length. The voice activity detection is also performed to the historical data of the telephone dialing test audios. After the voice activity detection, the muting part of the telephone dialing test audio is eliminated and only the effective audio is reserved. In detail, the preset length may be 2 ms, 5 ms, 10 ms, etc.

In block 202, a certain length of data to be processed of the telephone dialing test audio is cut out of the pretreated data of the telephone dialing test audio.

It should be noticed that, when the muting part of the telephone dialing test audio is eliminated, the length of the telephone dialing test audio may be different. Training the deep-learning model via audios with different lengths may cause inaccurate training result. Besides, when the telephone dialing test audio is too long, it may add burdens to the apparatus for classifying a telephone dialing test audio based on AI, and do harm to the extraction of the acoustics characteristics. In this embodiment, a certain length of the data of the audio is cut out of the pretreated data of the telephone dialing test audio as the data to be processed of the telephone dialing test audio. In detail, the certain length may be 200 ms, 300 ms, 500 ms, etc.

In block 203, the effective acoustic characteristics are extracted from the data to be processed according to a preset step size and a preset frame length.

In detail, the acoustic characteristics may include a linear prediction coefficient (LPC), a cepstral coefficient (CEP), Mel-frequency cepstral coefficients (MFCC), etc.

The preset step size and frame length may be set in advance according to experience or actual requirements. For example, the preset step size may be 10 ms, and the preset frame length may be 25 ms; or the preset step size may be 5 ms, and the preset frame length may be 20 ms, which is not limited here.

In an embodiment, extraction of MFCC is taken as an example, assuming the preset step size is 10 ms, and the preset frame length is 25 ms. The data to be processed of the telephone dialing test audio is put into a set of triangle filters which are in logarithmic distribution by frequency in the frame with 25 ms and in the step size with 10 ms; then logarithmic transformation is performed to output energy values of the filters, and results of the above actions are mapped into corresponding cepstral coefficients via a discrete cosine transform (DCT), so as to extract the effective acoustic characteristics.

Similarly, before training the deep-learning model via the historical data of the telephone dialing test audios and their corresponding telephone types, the method may also include extracting acoustic characteristics to be trained from the historical data of the telephone dialing test audios according to the preset rules.

Details of the process are similar to which of extracting the effective acoustic characteristics from the data of the telephone dialing test audio according to the preset rules, thus will not be elaborated here.

In practice, after the preset classifier is acquired, when the data of the telephone dialing test audio is received by the apparatus for classifying a telephone dialing test audio based on AI, the effective acoustic characteristics are extracted from the data of the telephone dialing test audio, and the similarities among the data of the telephone dialing test audio and the telephone types are acquired by the preset classifier, then the telephone type corresponding to the telephone dialing test audio is determined.

For example, assuming that the effective acoustic characteristics of the data of the telephone dialing test audio includes N frames, and the preset classifier includes M telephone types, the similarities among the data of the telephone dialing test audio and the types may be obtained via following actions so as to determine the type corresponding to the telephone dialing test audio.

In block 301, the effective acoustic characteristics are input into the preset classifier and the similarities among each of the N frames and the M telephone types are obtained.

In block 302, an average value of the similarities among the each of the N frames and the M telephone types is calculated so as to acquire M average values.

In block 303, a telephone type corresponding to a greatest value of the M average values is determined as the telephone type of the telephone dialing test audio.

For example, assuming that the effective acoustic characteristics of the data of the telephone dialing test audio includes 5 frames, and the preset classifier includes 3 telephone types, which are a cheating user, a normal user, and a pending user. When the effective acoustic characteristics is input into the classifier, the similarities among the 5 frames and the 3 telephone types is acquired as: similarities among the 1st frame and the cheating user, the normal user, and the pending user are (0.12, 0.68, 0.20); similarities among the 2nd frame and the cheating user, the normal user, and the pending user are (0.10, 0.71, 0.21); similarities among the 3rd frame and the cheating user, the normal user, and the pending user are (0.11, 0.72, 0.19); similarities among the 4th frame and the cheating user, the normal user, and the pending user are (0.08, 0.69, 0.21); and similarities among the 5th frame and the cheating user, the normal user, and the pending user are (0.09, 0.70, 0.19). Then an average value of the similarities among the each of the 5 frames and the 3 telephone types may be calculated to acquire 3 average values, which are (0.10, 0.70, 0.20). Finally, the greatest value of the average values is 0.70, thus the telephone type is determined as the normal user which corresponding to 0.70.

With the method for classifying a telephone dialing test audio based on AI according to embodiments of the present disclosure, the data of the telephone dialing test audio is acquired first, then the data of the telephone dialing test audio is processed via the preset classifier so as to obtain the similarities among the data of the telephone dialing test audio and the telephone types in the preset classifier, in which the preset classifier is the deep-learning model determined by the historical data of the telephone dialing test audios and their corresponding telephone types; finally, the telephone type corresponding to the telephone dialing test audio is determined according to the similarities. Therefrom, the telephone dialing test audio is classified via machine learning to determine whether a user is a normal user, thus human costs are saved and an efficiency of dialing test is increased.

Figure 3:
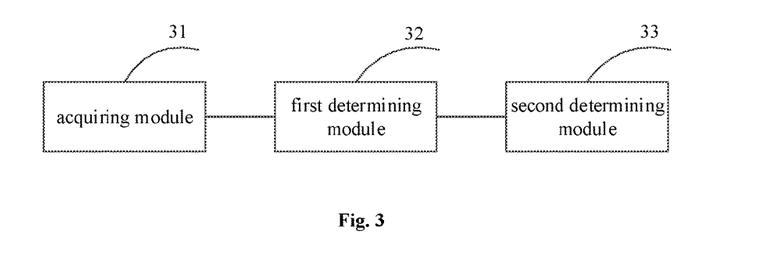
FIG. 3 is a block diagram illustrating an apparatus for classifying a telephone dialing test audio based on AI according to an embodiment of the present disclosure.

FIG. 3 is a block diagram illustrating an apparatus for classifying a telephone dialing test audio based on AI according to an embodiment of the present disclosure.

As illustrated in FIG. 3, the apparatus for classifying a telephone dialing test audio based on AI includes an acquiring module 31, a first determining module 32, and a second determining module 33.

The acquiring module 31 is configured to acquire data of a telephone dialing test audio.

The first determining module 32 is configured to process the data of the telephone dialing test audio via a preset classifier and to acquire similarities among the data of the telephone dialing test audio and telephone types in the preset classifier, in which, the preset classifier is a deep-learning model determined by historical data of telephone dialing test audios and telephone types corresponding to the historical data of the telephone dialing test audios.

The second determining module 33 is configured to determine a telephone type corresponding to the telephone dialing test audio according to the similarities.

The apparatus classifying a telephone dialing test audio based on AI according to embodiments of the present disclosure may be provided in any kind of applications, so as to perform the method for classifying a telephone dialing test audio based on AI according to FIG. 1.

It should be understood that the descriptions of the method for classifying a telephone dialing test audio based on AI according to FIG. 1 may also be applied to the apparatus for classifying a telephone dialing test audio based on AI according to embodiments of the present disclosure, thus will not be elaborated here.

With the apparatus for classifying a telephone dialing test audio based on AI according to embodiments of the present disclosure, the data of the telephone dialing test audio is acquired first, then the data of the telephone dialing test audio is processed via the preset classifier so as to obtain the similarities among the data of the telephone dialing test audio and the telephone types in the preset classifier, in which the preset classifier is the deep-learning model determined by the historical data of the telephone dialing test audios and their corresponding telephone types; finally, the telephone type corresponding to the telephone dialing test audio is determined according to the similarities. Therefrom, the telephone dialing test audio is classified via machine learning to determine whether a user is a normal user, thus human costs are saved and an efficiency of dialing test is increased.

Figure 4:
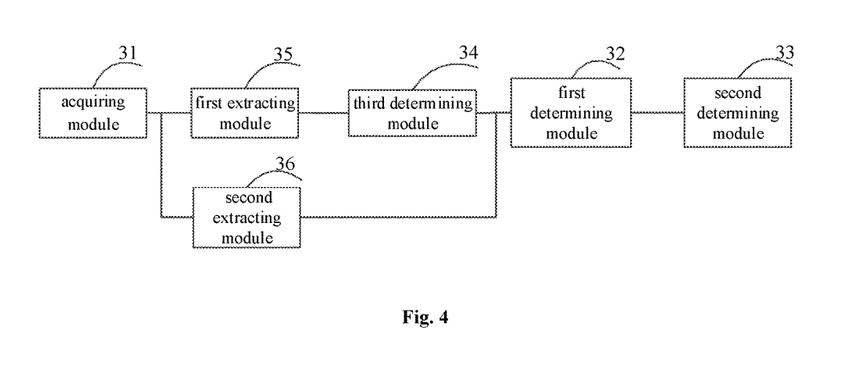
FIG. 4 is a block diagram illustrating an apparatus for classifying a telephone dialing test audio based on AI according to another embodiment of the present disclosure.
Figure 5:
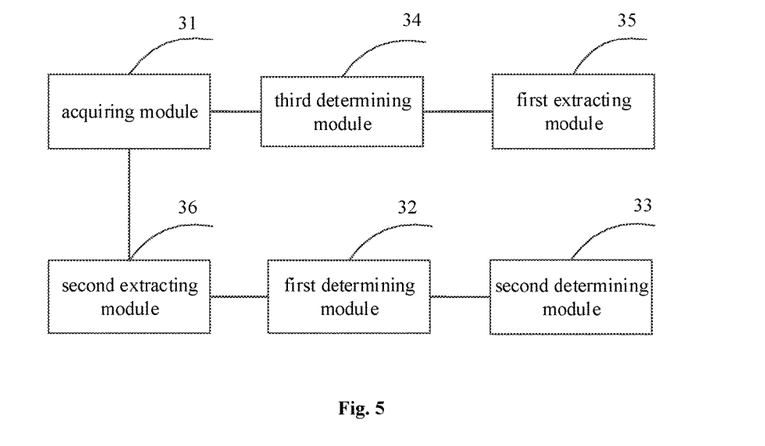
FIG. 5 is a block diagram illustrating an apparatus for classifying a telephone dialing test audio based on AI according to yet other embodiment of the present disclosure.

FIGS. 4 and 5 are a block diagram illustrating an apparatus for classifying a telephone dialing test audio based on AI according to another embodiments of the present disclosure.

As illustrated in FIG. 4 or FIG. 5, on the basis of FIG. 3, the apparatus for classifying a telephone dialing test audio based on AI further includes a third determining module 34 configured to train the deep-learning model via the historical data of the telephone dialing test audios and the telephone types corresponding to the historical data of the telephone dialing test audios to obtain the preset classifier.

In an embodiment, the apparatus for classifying a telephone dialing test audio based on AI further includes a first extracting module 35 configured to extract acoustic characteristics to be trained from the historical data of the telephone dialing test audios according to preset rules.

In an embodiment, the apparatus for classifying a telephone dialing test audio based on AI further includes a second extracting module 36 configured to extract effective acoustic characteristics from the data of the telephone dialing test audio according to the preset rules.

In an embodiment, the second extracting module 36 further includes an obtaining unit, a cutting unit, and an extracting unit (which are not illustrated).

The obtaining unit is configured to perform a voice activity detection to the data of the telephone dialing test audio so as to acquire pretreated data of the telephone dialing test audio.

The cutting unit is configured to cut a certain length of data to be processed of the telephone dialing test audio out of the pretreated data of the telephone dialing test audio.

The extracting unit is configured to extract the effective acoustic characteristics from the data to be processed according to a preset step size and a preset frame length.

In an embodiment, the effective acoustic characteristics include N frames, and the preset classifier includes M telephone types.

The first determining module 32 is specifically configured to:

put the effective acoustic characteristics into the preset classifier and acquire similarities among each of the N frames and the M telephone types;

calculate an average value of the similarities among the each of the N frames and the M telephone types so as to acquire M average values.

The second determining module 33 is specifically configured to:

determine a telephone type corresponding to a greatest value of the M average values as the telephone type of the telephone dialing test audio.

It should be understood that, the descriptions of the method for classifying a telephone dialing test audio based on AI according to FIG. 1 and FIG. 2 may also be applied to the apparatus for classifying a telephone dialing test audio based on AI according to embodiments of the present disclosure, thus will not be elaborated here.

With the apparatus for classifying a telephone dialing test audio based on AI according to embodiments of the present disclosure, the data of the telephone dialing test audio is acquired first, then the data of the telephone dialing test audio is processed via the preset classifier so as to obtain the similarities among the data of the telephone dialing test audio and the telephone types in the preset classifier, in which the preset classifier is the deep-learning model determined by the historical data of the telephone dialing test audios and their corresponding telephone types; finally, the telephone type corresponding to the telephone dialing test audio is determined according to the similarities. Therefrom, the telephone dialing test audio is classified via machine learning to determine whether a user is a normal user, thus human costs are saved and an efficiency of dialing test is increased.

To achieve the above objectives, embodiments according to a third aspect of the present disclosure provide a terminal, including: a processor; a memory for storing instructions executable by the processor; in which, the processor is configured to: acquire data of a telephone dialing test audio; processing the data of the telephone dialing test audio via a preset classifier, and acquire similarities among the data of the telephone dialing test audio and telephone types in the preset classifier, in which, the preset classifier is a deep-learning model determined by historical data of telephone dialing test audios and telephone types corresponding to the historical data of the telephone dialing test audios; determine a telephone type corresponding to the telephone dialing test audio according to the similarities.

To achieve the above objectives, embodiments according to a fourth aspect of the present disclosure provide a non-transitory computer readable storage medium. When instructions stored in the storage medium is executed by a processor of a mobile terminal, the mobile terminal is caused to perform a method for classifying a telephone dialing test audio based on AI, and the method includes: acquiring data of a telephone dialing test audio; processing the data of the telephone dialing test audio via a preset classifier, and acquiring similarities among the data of the telephone dialing test audio and telephone types in the preset classifier, in which, the preset classifier is a deep-learning model determined by historical data of telephone dialing test audios and telephone types corresponding to the historical data of the telephone dialing test audios; determining a telephone type corresponding to the telephone dialing test audio according to the similarities.

To achieve the above objectives, embodiments according to a fifth aspect of the present disclosure provide a computer program product, when instructions stored in the computer program product is executed by a processor, a method for classifying telephone dialing test audio based on AI is performed, and the method includes: acquiring data of a telephone dialing test audio; processing the data of the telephone dialing test audio via a preset classifier, and acquiring similarities among the data of the telephone dialing test audio and telephone types in the preset classifier, in which, the preset classifier is a deep-learning model determined by historical data of telephone dialing test audios and telephone types corresponding to the historical data of the telephone dialing test audios; determining a telephone type corresponding to the telephone dialing test audio according to the similarities.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, for example, two, three, etc., unless specifically and particularly prescribed otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been illustrated and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A method for classifying a telephone dialing test audio based on artificial intelligence, comprising:
    acquiring, by at least one computing device, data of a telephone dialing test audio;
    processing, by the at least one computing device, the data of the telephone dialing test audio via a preset classifier, and acquiring, by the at least one computing device, similarities among the data of the telephone dialing test audio and telephone types in the preset classifier, wherein, the preset classifier is a deep-learning model determined by historical data of telephone dialing test audios and telephone types corresponding to the historical data of the telephone dialing test audios;
    determining, by the at least one computing device, a telephone type corresponding to the telephone dialing test audio according to the similarities, to determine whether a user is the normal user according to the telephone dialing test audio.

2. The method according to claim 1, wherein, before processing, by the at least one computing device, the data of the telephone dialing test audio via a preset classifier, the method further comprises:
    training, by the at least one computing device, the deep-learning model via the historical data of the telephone dialing test audios and the telephone types corresponding to the historical data of the telephone dialing test audios to obtain the preset classifier.

3. The method according to claim 2, wherein, before training, by the at least one computing device, the deep-learning model via the historical data of the telephone dialing test audios and the telephone types corresponding to the historical data of the telephone dialing test audios, the method further comprises:

extracting, by the at least one computing device, acoustic characteristics to be trained from the historical data of the telephone dialing test audios according to preset rules.

4. The method according to claim 3, wherein, before processing, by the at least one computing device, the data of the telephone dialing test audio via a preset classifier, the method further comprises:

extracting, by the at least one computing device, effective acoustic characteristics from the data of the telephone dialing test audio according to the preset rules.

5. The method according to claim 4, wherein, extracting, by the at least one computing device, the effective acoustic characteristics from the data of the telephone dialing test audio according to the preset rules comprises:

performing, by the at least one computing device, a voice activity detection to the data of the telephone dialing test audio so as to acquire pretreated data of the telephone dialing test audio;

cutting, by the at least one computing device, a certain length of data to be processed of the telephone dialing test audio out of the pretreated data of the telephone dialing test audio;

extracting, by the at least one computing device, the effective acoustic characteristics from the data to be processed according to a preset step size and a preset frame length.

6. The method according to claim 5, wherein, the effective acoustic characteristics comprise N frames, the preset classifier comprises M telephone types, and acquiring, by the at least one computing device, similarities among the data of the telephone dialing test audio and telephone types in the preset classifier comprises:

putting, by the at least one computing device, the effective acoustic characteristics into the preset classifier and acquiring similarities among each of the N frames and the M telephone types;

calculating, by the at least one computing device, an average value of the similarities among the each of the N frames and the M telephone types so as to acquire M average values;

determining, by the at least one computing device, a telephone type corresponding to the telephone dialing test audio according to the similarities comprises:

determining, by the at least one computing device, a telephone type corresponding to a greatest value of the M average values as the telephone type of the telephone dialing test audio.

7. An apparatus for classifying a telephone dialing test audio based on artificial intelligence, comprising:

a processor;

a memory for storing instructions executable by the processor, wherein the processor is configured to:

acquire data of a telephone dialing test audio;

process the data of the telephone dialing test audio via a preset classifier, and acquire similarities among the data of the telephone dialing test audio and telephone types in the preset classifier, wherein, the preset classifier is a deep-learning model determined by historical data of telephone dialing test audios and telephone types corresponding to the historical data of the telephone dialing test audios;

determine a telephone type corresponding to the telephone dialing test audio according to the similarities, to determine whether a user is the normal user according to the telephone dialing test audio.

8. The apparatus according to claim 7, wherein the processor is further configured to:

train the deep-learning model via the historical data of the telephone dialing test audios and the telephone types corresponding to the historical data of the telephone dialing test audios to obtain the preset classifier.

9. The apparatus according to claim 8, wherein the processor is further configured to:

extract acoustic characteristics to be trained from the historical data of the telephone dialing test audios according to preset rules.

10. The apparatus according to claim 9, wherein the processor is further configured to:

extract effective acoustic characteristics from the data of the telephone dialing test audio according to the preset rules.

11. The apparatus according to claim 10, wherein the processor is configured to extract the effective acoustic characteristics from the data of the telephone dialing test audio according to the preset rules by acts of:

performing a voice activity detection to the data of the telephone dialing test audio so as to acquire pretreated data of the telephone dialing test audio;

cutting a certain length of data to be processed of the telephone dialing test audio out of the pretreated data of the telephone dialing test audio;

extracting the effective acoustic characteristics from the data to be processed according to a preset step size and a preset frame length.

12. The apparatus according to claim 11, wherein, the effective acoustic characteristics comprise N frames, the preset classifier comprises M telephone types, and the processor is configured to acquire similarities among the data of the telephone dialing test audio and telephone types in the preset classifier by acts of:

putting the effective acoustic characteristics into the preset classifier and acquiring similarities among each of the N frames and the M telephone types;

calculating an average value of the similarities among the each of the N frames and the M telephone types so as to acquire M average values;

the processor is configured to determine a telephone type corresponding to the telephone dialing test audio according to the similarities by acts of determining a telephone type corresponding to a greatest value of the M average values as the telephone type of the telephone dialing test audio.

13. A non-transitory computer readable storage medium comprising instructions, wherein when the instructions are executed by a processor of a device, the device is caused to perform a method for classifying a telephone dialing test audio based on AI, and the method comprises:

acquiring data of a telephone dialing test audio;

processing the data of the telephone dialing test audio via a preset classifier, and acquiring similarities among the data of the telephone dialing test audio and telephone types in the preset classifier, wherein, the preset classifier is a deep-learning model determined by historical data of telephone dialing test audios and telephone types corresponding to the historical data of the telephone dialing test audios;

determining a telephone type corresponding to the telephone dialing test audio according to the similarities, to determine whether a user is the normal user according to the telephone dialing test audio.

14. The non-transitory computer readable storage medium according to claim 13, wherein before processing the data of the telephone dialing test audio via a preset classifier, the method further comprises:
   training the deep-learning model via the historical data of the telephone dialing test audios and the telephone types corresponding to the historical data of the telephone dialing test audios to obtain the preset classifier.

15. The non-transitory computer readable storage medium according to claim 14, wherein before training the deep-learning model via the historical data of the telephone dialing test audios and the telephone types corresponding to the historical data of the telephone dialing test audios, the method further comprises:
   extracting, by the at least one computing device, acoustic characteristics to be trained from the historical data of the telephone dialing test audios according to preset rules.

16. The non-transitory computer readable storage medium according to claim 15, wherein before processing the data of the telephone dialing test audio via a preset classifier, the method further comprises:
   extracting effective acoustic characteristics from the data of the telephone dialing test audio according to the preset rules.

17. The non-transitory computer readable storage medium according to claim 16, wherein, extracting the effective acoustic characteristics from the data of the telephone dialing test audio according to the preset rules comprises:
   performing a voice activity detection to the data of the telephone dialing test audio so as to acquire pretreated data of the telephone dialing test audio;
   cutting a certain length of data to be processed of the telephone dialing test audio out of the pretreated data of the telephone dialing test audio;
   extracting the effective acoustic characteristics from the data to be processed according to a preset step size and a preset frame length.

18. The non-transitory computer readable storage medium according to claim 17, wherein the effective acoustic characteristics comprise N frames, the preset classifier comprises M telephone types, and acquiring similarities among the data of the telephone dialing test audio and telephone types in the preset classifier comprises:
   putting the effective acoustic characteristics into the preset classifier and acquiring similarities among each of the N frames and the M telephone types;
   calculating an average value of the similarities among the each of the N frames and the M telephone types so as to acquire M average values;
   determining a telephone type corresponding to the telephone dialing test audio according to the similarities comprises:
   determining a telephone type corresponding to a greatest value of the M average values as the telephone type of the telephone dialing test audio.

* * * * *